(12) United States Patent
Chu et al.

(10) Patent No.: US 11,137,969 B2
(45) Date of Patent: Oct. 5, 2021

(54) INFORMATION INTERACTION METHOD, INFORMATION INTERACTION SYSTEM, AND APPLICATION THEREOF

(71) Applicant: YEALINK (XIAMEN) NETWORK TECHNOLOGY CO., LTD., Xiamen (CN)

(72) Inventors: Yingkun Chu, Xiamen (CN); Yun Liao, Xiamen (CN)

(73) Assignee: YEALINK (XIAMEN) NETWORK TECHNOLOGY CO., LTD., Xiamen (CN)

( * ) Notice: Subject to any disclaimer, the term of this patent is extended or adjusted under 35 U.S.C. 154(b) by 0 days.

(21) Appl. No.: 17/027,127

(22) Filed: Sep. 21, 2020

(65) Prior Publication Data

US 2021/0096807 A1  Apr. 1, 2021

(30) Foreign Application Priority Data

Sep. 30, 2019 (CN) .......................... 201910938263.X (51) Int. Cl.
| | |
|---|---|
| *G06F 3/14* | (2006.01) |
| *G06T 1/20* | (2006.01) |
| *G06T 11/20* | (2006.01) |
| *G06T 11/60* | (2006.01) |
| *G06F 3/0488* | (2013.01) |

(52) U.S. Cl.
CPC .............. *G06F 3/1462* (2013.01); *G06T 1/20* (2013.01); *G06T 11/203* (2013.01); *G06T 11/60* (2013.01); *G06F 3/0488* (2013.01)

(58) Field of Classification Search
CPC ....... G06F 3/1462; G06F 3/0488; G06T 1/20; G06T 11/203; G06T 11/60
See application file for complete search history.

(56) References Cited

U.S. PATENT DOCUMENTS

| | | | | |
|---|---|---|---|---|
| 2006/0041564 | A1* | 2/2006 | Jain ....................... | G06F 16/907 |
| 2006/0288218 | A1* | 12/2006 | Kotipalli ............. | G06F 21/6245 |
| | | | | 713/176 |
| 2012/0089659 | A1* | 4/2012 | Halevi ................ | G06F 3/04842 |
| | | | | 709/201 |

(Continued)

FOREIGN PATENT DOCUMENTS

CN          104038722 B          4/2018

*Primary Examiner* — David T Welch (57) ABSTRACT

The present disclosure discloses an information interaction method, an information interaction system, and an application thereof, and belongs to the field of electronic whiteboards. In view of the problems in the prior art that an electronic whiteboard in a conference system has a large amount of data to be transmitted, requires a large interaction bandwidth, and has high network requirements, the present disclosure provides an information interaction method: When an image is annotated on the local device, the host serializes the annotation on the local device. The remote device combines the serialized data and corresponding coordinates and pressure sensing values, to calculate and draw an image for display from the data by using a GPU. The interaction method is applied to the electronic whiteboard in the conference system, thereby realizing multi-party real-time interactive whiteboard collaboration, which is supported in both local conferences and teleconferences.

9 Claims, 4 Drawing Sheets

(56) References Cited

U.S. PATENT DOCUMENTS

| | | | |
|---|---|---|---|
| 2013/0031453 A1* | 1/2013 | Griffiths | G06F 40/169 |
| | | | 715/230 |
| 2015/0301721 A1* | 10/2015 | Clark | H04L 67/10 |
| | | | 715/780 |
| 2017/0337168 A1* | 11/2017 | Kunze | H04L 67/02 |
| 2018/0089324 A1* | 3/2018 | Pal | G06F 9/5011 |

\* cited by examiner

INFORMATION INTERACTION METHOD, INFORMATION INTERACTION SYSTEM, AND APPLICATION THEREOF

BACKGROUND

Technical Field

The present disclosure relates to the field of electronic whiteboards, and more specifically, to an information interaction method, an information interaction system, and an application thereof.

Related Art

Teleconferencing generally refers to videoconferencing, which remotely and interactively shares voice and video images. For data interaction within a computer, it is conventional to convert data into videos for transmission. This significantly reduces image quality and real-time interactivity. With the development of conference content data, an interactive writing system appears timely, making up this deficiency. Teleconference systems mainly include conference calls, web conferencing, and video conferences.

To improve the participation and interaction of participants in a conference and improve the efficiency of collaborative communication, some electronic tools are usually used in conferences. However, there are still many problems with the use of electronic tools in conferences. To transfer the display content of a computer to a projector, the most common method is to use some wired or wireless projection devices to display the content on a large screen of a conference room, so that all participants can share it. However, only presentation sharing is not enough. For example, during a conference, if a participant simply records the key points of the speaker, it may result in low participation and interactivity and inefficiency of the conference. In addition, during the conference, the speaker may need to make a certain annotation and explanation on the presented content, and conventionally, a content annotation is made by using certain software installed. This method is time-consuming and laborious, and the effects are not satisfactory. Therefore, the use of interactive electronic whiteboards becomes particularly important in conferences.

Currently, interactive electronic whiteboards are used more frequently in conferences, especially in teleconferences. The electronic whiteboard, combined with a computer and a projector, can realize paperless office and teaching. The electronic whiteboard may be a separate touchscreen computer used independently to perform tasks and operations, or may be a connectable device used as a touchpad to control a computer at a projector.

Widely used electronic whiteboards include the Click-Share wireless presentation system from Barco and the conference panel from MAXHUB. They feature advantages of plug-and-play, no additional software drive, and simple installation and deployment. However, they support local conferences only and do not support multi-party interactive teleconferences. Moreover, writing interaction is unidirectional. That is, after an annotation mode is enabled, only a projection image of a PC screen is captured and can be annotated and displayed only on an interactive electronic panel (touch panel), but annotation content is not displayed on the PC at the same time. In addition, video collaboration in teleconferences is not supported. Writing and annotating can be performed only on a touch television. Similarly, written content is not returned to the PC for display.

In addition to the unidirectional collaborative interaction of the electronic whiteboard, whiteboard interaction is realized by using an auxiliary stream (computer screen projection). That is, a party initiating sharing opens a blank page, writes on the page, captures the page as a video stream, and sends the video stream to a participant. This method has good compatibility, and a participant (including a third party) can view the content provided that the auxiliary stream can be viewed, no matter whether the electronic whiteboard or writing is supported. However, disadvantages are also obvious. Because a complete image needs to be captured as a video stream for transmission, the video stream is continuously transmitted even if a user no longer writes anything. As a result, bandwidth occupied by the video stream is relatively large, and a network requirement is relatively high.

Chinese Patent Application No. CN201310069962.8, published on Apr. 6, 2018, discloses a content interaction method and system for video conferences. Based on a whiteboard interaction service, namely, a more important practical service extended on the basis of a dual-stream function, participant terminals perform annotation interaction in content shared through an auxiliary video, and the problem of data interaction in conference television is solved. Meanwhile, due to the fact that the forms of content shared in the auxiliary video are diverse, this invention further provides a new form of video conference. That is, a variety of commonly used applications are directly used on a video conference terminal, which greatly enhances the usability of conference televisions. Therefore, this invention enables participants of a video conference to communicate with each other more fully, makes functions of the video conference terminal more powerful, and enables the goal of creating the feeling of participating in a conference in the same conference room whenever and wherever possible to be achieved more easily. According to this invention, a complete image is captured and transmitted as a video stream, a large amount of data is transmitted, and a large bandwidth is occupied. Moreover, whiteboard collaboration in this invention needs to be forwarded through a conference convener terminal, and data transmission is complicated.

SUMMARY

1. Technical Problems to be Solved

In view of the problems in the prior art that an electronic whiteboard in a conference system has a large amount of data to be transmitted, requires a large interaction bandwidth, and have high network requirements, the present disclosure provides an information interaction method, an information interaction system, and an application thereof. All devices can open an independent electronic whiteboard program, and only handwriting data is sent during writing. After receiving the handwriting data, all participants display the handwriting data on a screen, thereby realizing multi-party real-time interactive whiteboard collaboration, which is supported in both local conferences and teleconferences.

2. Technical Solutions

The objective of the present disclosure is achieved by using the following technical solutions.

In an information interaction method, a host serializes annotation information of the drawn line segment on a local device, and a display terminal draws an image for display according to the serialized annotation information of the drawn line segment and annotation related information through computing with a GPU. In the present disclosure, during data interaction, annotation data is serialized, only annotated handwriting information is sent, and image information is shared through an auxiliary stream, so that bandwidth occupied by real-time interaction is small, and a network requirement is low.

Still further, specific interaction steps are as follows:

step 1: the host displays an image on the local device and on the display terminal by using an internal display module;

step 2: a user annotates the image on the local device, where during annotation, annotation information of the drawn line segment is sent to the host for serialization, and then the serialized drawn line segment information is sent to the display terminal;

step 3: the local device sends annotation related information to the display terminal by using the host;

step 4: the display terminal deserializes the received serialized drawn line segment information, adds the annotation related information to a recorded line segment, and draws an image for display through computing with the GPU.

The annotation information and the video image are displayed separately at two layers. First, the video image is displayed, and then the annotation information is overlaid on the video image. In this case, the background of the annotation information is transparent, and the annotation information is displayed as if the handwriting information is fused into the video image. The video image and the annotation information are also separately received. The video image and the annotation information do not need to be used at the same time. The user can use only the video image or only the whiteboard annotation. Different from the case when the annotation information and the video image data are both displayed, the background of the annotation information is not transparent but is white by default, and the color is adjustable. The drawn line segment information and coordinates and pressure sensing values are sent separately, so that the handwriting is displayed in real time on the local device and the display terminal device. When the user starts to draw on the local device, the line segment information is sent to the display terminal to inform that a new line segment is being generated. As the pen slides, coordinate information of points is obtained, and the points are drawn one by one to form a line. At the same time, the point information is synchronously sent to the display terminal. Each time the display terminal receives one piece of point information, the display terminal determines which line segment the point belongs to and adds the point to the line segment for drawing. This makes it possible to synchronously draw the points on the local device and the display terminal.

Still further, the annotation information of the drawn line segment includes a line segment ID, a user ID, and a timestamp attribute. The annotation information of the drawn line segment is divided into an attribute part and an ID part after serialization processing, which include the line segment ID, the user ID, and the timestamp attribute.

Still further, the annotation related information includes coordinates and pressure sensing values. The coordinates and pressure sensing values and the annotation information of the drawn line segment are separately sent, so as to ensure real-time transmission of the annotation information. When the user starts to draw on the local device, the line segment information is sent to the display terminal to inform that a new line segment is being generated. As the pen slides, coordinate information of points is obtained, and the points are drawn one by one to form a line. At the same time, the point information is synchronously sent to the display terminal. Each time the display terminal receives one piece of point information, the display terminal determines which line segment the point belongs to and adds the point to the line segment for drawing. This makes it possible to synchronously draw the points on the local device and the display terminal.

Still further, the annotation information of the drawn line segment and the annotation related information are transmitted separately. The line segment information and the point coordinate and pressure sensing value data are transmitted separately, so as to ensure real-time data transmission. If the data is sent together, to obtain complete point coordinate information, the data can be sent to the display terminal only after a complete line is drawn on the local device. In this case, real-time display on the both parties cannot be realized.

Still further, the local device and the display terminal serialize and deserialize the drawn line segment information by using serialization rules. The local device and the display terminal use the same serialization rules, and use the same rules to serialize and deserialize the drawn line segment information.

Still further, the host sends processed data to another display terminal by using a network module while processing the annotation information. After receiving the annotation information and serializing the annotation information, the host sends the annotation information to another display terminal by using the network module, draws handwriting information based on the annotation related information through computing with a GPU, and displays the handwriting information on the local device.

An information interaction system using the information interaction method is provided, the system includes a host, a touch display device, and an electronic whiteboard device. A local device is the touch display device, and a display terminal is the electronic whiteboard device. In the interaction method of the electronic whiteboard, during interaction, a user makes an annotation mark on the touch display device, draws line segment data and transmits the line segment data to the host for serialization processing, and then sends the line segment information to the electronic whiteboard device. The electronic whiteboard device receives and remembers the line segment information, and the touch display device randomly sends coordinates and pressure sensing values to the electronic whiteboard device. After receiving the coordinates and the pressure sensing values, the electronic whiteboard device adds them to a recorded line segment, and an image is calculated and drawn by using a GPU and displayed on the electronic whiteboard device. There may be a plurality of electronic whiteboard devices and touch display devices. The plurality of electronic whiteboard devices allow different people to annotate, and the plurality of touch display devices may realize extended display. The electronic whiteboard device may be a tablet computer or a PC, which is an accessory used for connecting the host. Video and annotation information on the host may be synchronously displayed on the accessory, and annotations may be input on the accessory. The electronic whiteboard device does not communicate with the touch display device. Data is synchronized to the host first, and the host performs transmission synchronization. In the electronic whiteboard system of the present disclosure, the electronic whiteboard device and the touch display device are only one kind of extended display and control of the host.

Still further, the host includes a data processing module, a touch control module, a display module, and a network module. The data processing module includes a media module and a collaboration module. The media module provides an audio/video service, and transmits audios/videos to each participant terminal by using a SIP protocol. The collaboration module is responsible for processing annotation data and transmitting the data to each collaboration device by using a TCP-based proprietary protocol. The touch control module and the display module are respectively connected to the touch display device and the host. Data of the touch display device is transmitted to the host through the touch control module, and the host transmits processed data to the touch display device through the display module. In the present disclosure, the user can use the touch display device as the local device to make an annotation mark and interact with another participant terminal in real time. Alternatively, the electronic whiteboard device may be used as the local device to make an annotation mark, and interactively display information on the touch display device.

A conference system is an application of the information interaction system of the present disclosure, and includes the information interaction system. The conference system is a local conference system or a teleconference system. The conference system of the present disclosure supports a local conference and a teleconference. In a teleconference, each conference room is connected to a cloud server, and different conference rooms are registered on a designated cloud server and are connected to each other to interact. In addition to the information interaction system, the conference system further includes corresponding conference input/output devices such as a microphone, a camera, and an audio playback device. In addition to a physical video conference room, a personal mobile device may also be used to attend a conference and make an annotation mark, such as a mobile phone, a personal PC, or a tablet computer.

In the present disclosure, only handwriting data is sent during information interaction, and any party may freely write and share an auxiliary stream on the touch display device during image sharing. In the present disclosure, multi-party interactive electronic whiteboard collaboration is supported in a teleconference. An independent electronic whiteboard program is enabled on all devices, and only handwriting data is sent during writing. After receiving the handwriting data, all participants display the handwriting data on a screen, thereby implementing real-time interactive whiteboard collaboration.

3. Beneficial Effects

Compared with the prior art, the present disclosure has the following advantages:

Different from other technical solutions, the electronic whiteboard described in this technical solution can be applied to a teleconference. An independent electronic whiteboard program is enabled on all devices, and only handwriting data is sent during writing. After receiving the handwriting data, all participants display the handwriting data on a screen. Only handwriting needs to be transmitted, the amount of data is small, and the handwriting needs to be sent only once. When the user stops writing, no new data needs to be sent, and bandwidth dependency is low. In addition, the image viewed by the participants is not blurred due to network deterioration, and the network requirement is low.

DETAILED DESCRIPTION

The present disclosure will be described in detail below with reference to the accompanying drawings and specific embodiments.

Embodiment 1

Figure 2:
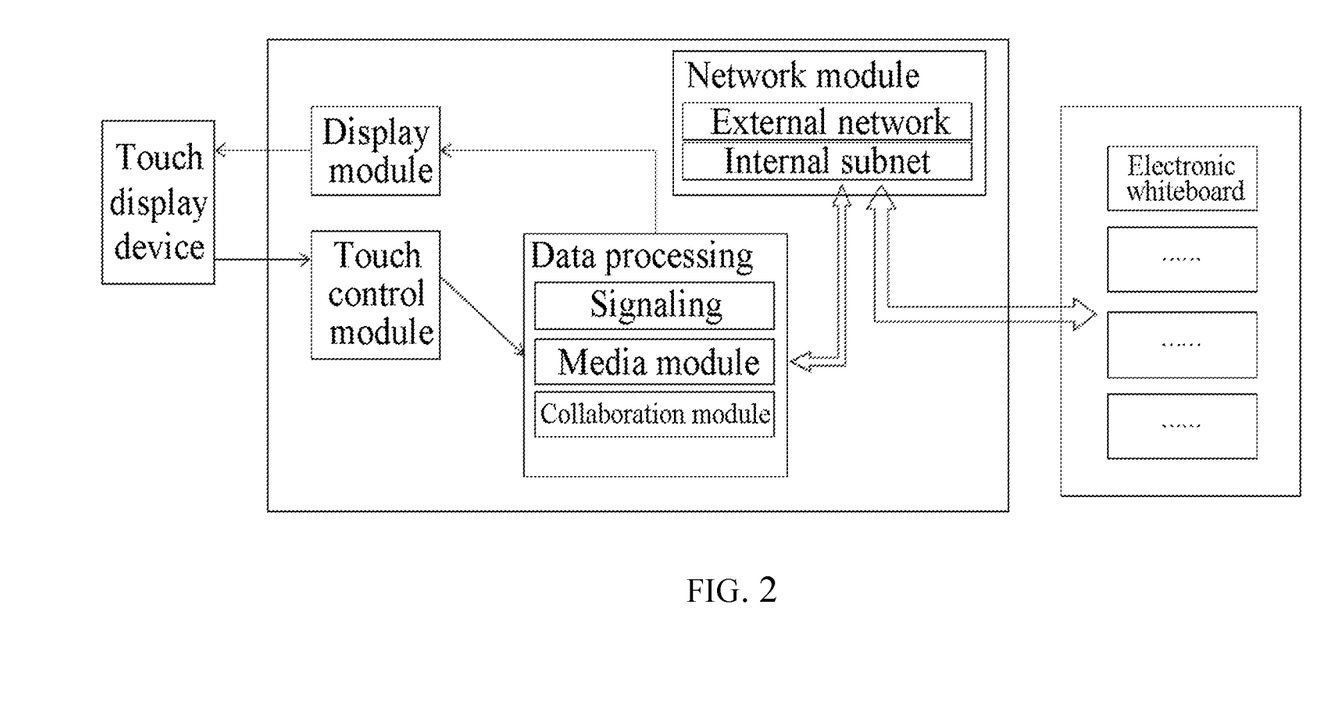
FIG. 2 is an electronic whiteboard collaboration application in a local conference of the present disclosure.

FIG. 2 shows an embodiment of an electronic whiteboard collaboration application in a local conference. As shown in the figure, an electronic whiteboard system includes a host, a touch display device, and an electronic whiteboard device. There are at least one electronic whiteboard device and at least one touch display device. The host is connected to both the touch display device and the electronic whiteboard device. The host includes a data processing module, a touch control module, a display module, and a network module. The data processing module includes a media module, a collaboration module, and signaling, and the network module includes an external network and an internal subnet. The touch display device is commonly referred to as a touch TV. After a user makes a content annotation on the touch display device, the touch control module transmits a USB touch signal to the host for data processing. The touch display device is connected to the host through the display module and the touch control module. Data of the touch display device is transmitted to the data processing module through the touch control of the host. The data processing module is responsible for data processing. Processed data is transmitted to the touch display device through the display module, and the processed data is also transmitted to the electronic whiteboard device for display through the network module. The electronic whiteboard device receives the data information transmitted by the host for integration and display. The media module in the host provides an audio/video service, and transmits audios/videos to participant terminals by using a SIP protocol. The collaboration module is responsible for processing annotation data and transmitting the data to collaboration devices, such as the electronic whiteboard device and the touch display device, by using a TCP-based proprietary protocol.

In a conference, a conference system includes a conference room, an electronic whiteboard system, an audio playback device, a microphone, and a camera. The electronic whiteboard system includes a host, a touch display device, and an electronic whiteboard device. In a local conference, when a party sends presentation content to be shared, the host transmits the received presentation content to the touch display device through the display module. The presentation content is video content of an auxiliary stream. Video information is transmitted and received by the media module. The video information is encoded at a transmit end, and a receive end decodes the video information and then displays the video information on a screen of the touch display device. After receiving drawn line segment information, coordinates, and pressure sensing values, the display module obtains a line segment and a position to be drawn, draws handwriting through computing with a GPU, and displays the handwriting on the touch display device. In this embodiment, the electronic whiteboard device is used in the interaction system. In the information interaction system of the present disclosure, another device, such as a mobile phone, a personal PC, or a tablet computer, may alternatively be used to perform information interaction, provided that the device is connected to the interaction system.

Figure 1:
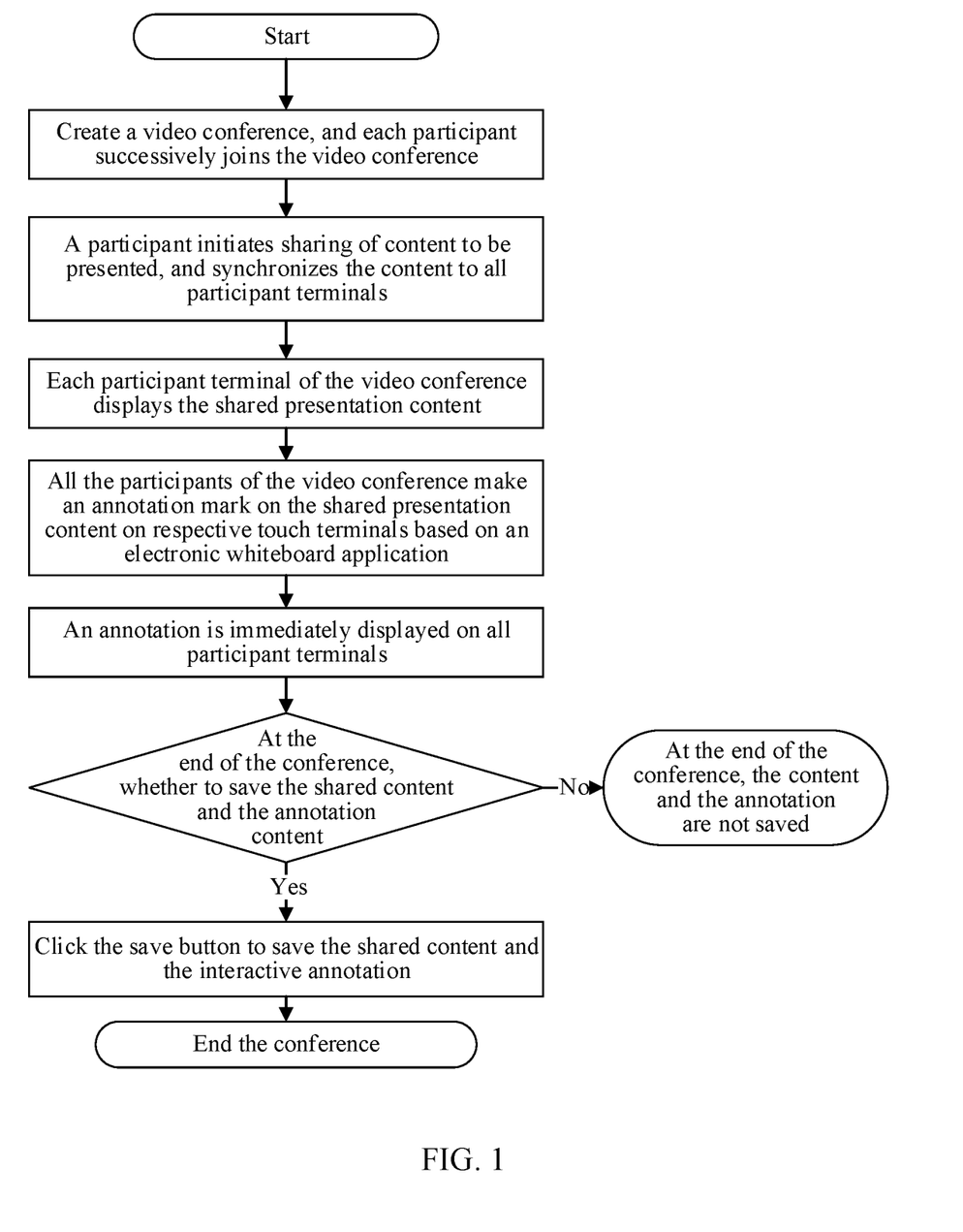
FIG. 1 is a flowchart of annotation interaction of shared content in a conference of the present disclosure.

FIG. 1 is a flowchart of annotation interaction of shared content in a conference of the present disclosure. Interaction steps are as follows:

S1: A user creates a video conference, and each participant successively joins the video conference through a conference room connection.

S2: A participant initiates sharing of content to be presented, synchronizes the shared content to another participant terminal through a network module, and displays data on a terminal supporting display; and each participant terminal of the video conference displays the shared presentation content.

S3: All the participants of the video conference perform an annotation mark interactive action on the shared presentation content on respective touch terminals based on an electronic whiteboard collaboration application.

S4: A new annotation made by the user is synchronized in real time and displayed on all participant terminals after interacting with an electronic whiteboard system.

S5: When the conference ends, the participant may choose whether to save the shared content and the annotation on the presentation content. If the shared content and the annotation need to be saved, click the save button in a conference control interface to save the shared content and the interactive annotation in the conference. The content to be saved is stored on the current terminal or another peripheral with a storage capability, such as a USB flash drive. If the data does not need to be saved, the conference ends, and the content and the annotation are not saved.

Figure 4:
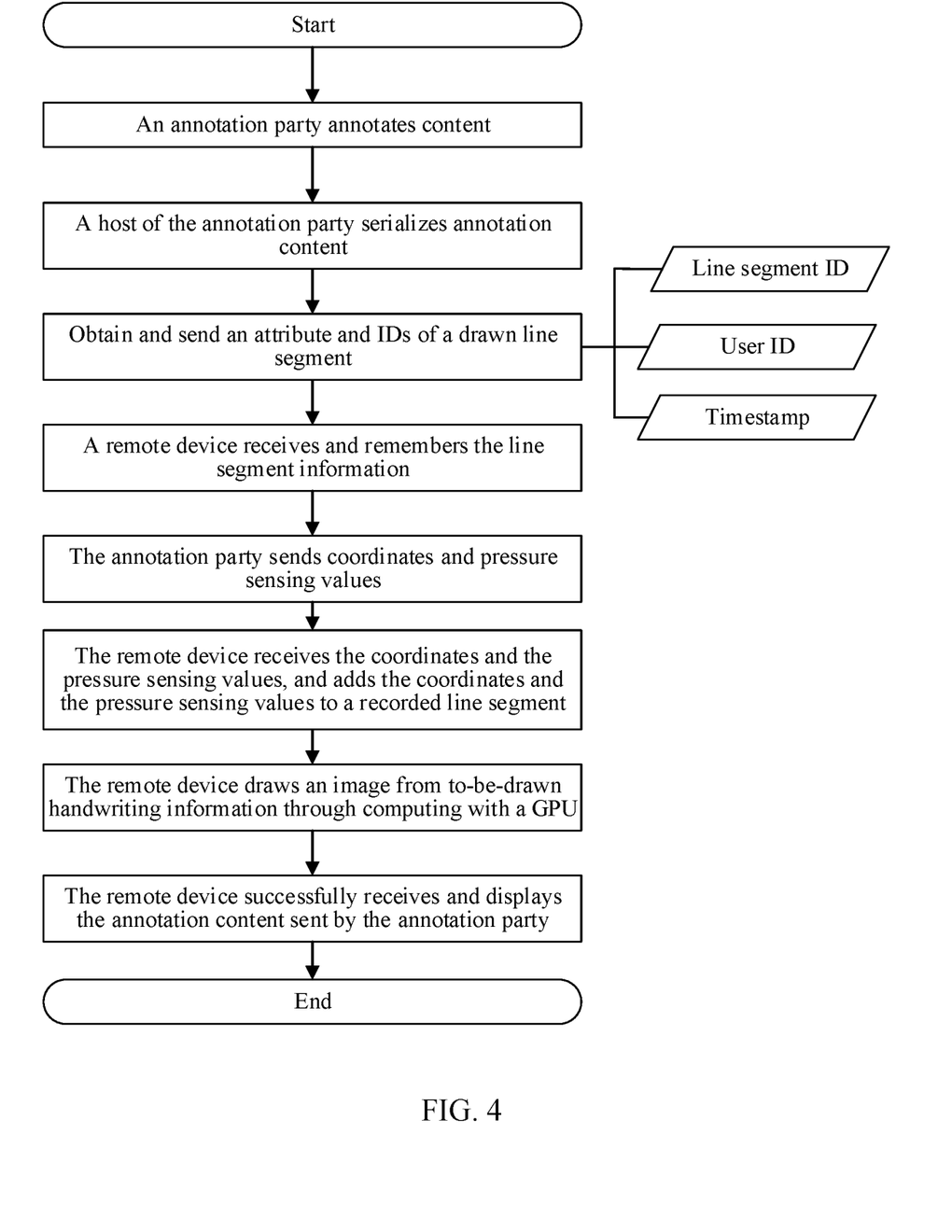
FIG. 4 is a flowchart of annotation interaction of the present disclosure.

In the above shared content interaction of the conference, the annotation interaction of the electronic whiteboard is shown in FIG. 4, and detailed steps are as follows:

Step 1: A party in a conference, that is, an annotation party, annotates shared content.

Step 2: A host of the annotation party serializes annotation content by using a CPU to obtain and send an attribute and IDs of a drawn line segment, including a line segment ID, a user ID, and a timestamp attribute.

Step 3: The annotation party first sends line segment information such as the attribute and IDs of the drawn line segment to a receiver, that is, a display terminal; and the display terminal receives and remembers the line segment information.

Step 4: The annotation party immediately sends coordinates and pressure sensing values.

Step 5: The display terminal receives the coordinates and the pressure sensing values, and adds the coordinates and the pressure sensing values to a recorded line segment.

Step 6: The display terminal draws an image from to-be-drawn handwriting information through computing with a GPU, and successfully receives and displays, on a display device of the display terminal, the annotation content sent by the annotation party.

When there are a plurality of electronic whiteboard devices in the conference system, the host transmits data transmitted from the touch display device to an electronic whiteboard application of another device through the internal subnet, and the content on the touch display device can be simultaneously displayed on the plurality of electronic whiteboard devices. In addition, the user can annotate the content on the electronic whiteboard, and return the annotation to the host for data processing by using a TCP-based proprietary protocol. Then, the data is transmitted to the touch TV, thereby realizing simultaneous display on the two sides and interactive collaboration.

The data content and format of collaborative data transmission between the local device and the electronic whiteboard of another device in the intranet are the same as those in the transmission between the local device and the display terminal. In both cases, the host processes data and then outputs the data for display.

Drawn line segment data is sent to the host. After receiving touch point information, the host mainly processes two procedures: first, generating corresponding handwriting information, including an ID, a timestamp, accurate coordinates, pressure sensing values, and the like, according to the touch point information, calculating and drawing handwriting based on the information by using a GPU, and displaying the handwriting on the touch display device; and second, simultaneously sending the handwriting to the electronic whiteboards of the display terminal participant and other devices of the local intranet, and sending the handwriting information serialized in binary, that is, the annotation information, to the display terminal participants according to agreed rules between the local terminal and the display terminal. The line segment ID, the user ID, and the timestamp attribute information are sent first. The line segment ID is a unique identifier locally generated by an owner. The user ID indicates an owner of the annotated line segment. The timestamp is attribute information of the time when the annotated line segment is generated. The electronic whiteboard device and the host synchronously draw and display the image. The line segment information and the point coordinate and pressure sensing value data are transmitted separately, so as to ensure real-time data transmission. If the data is sent together, to obtain complete point coordinate information, the data can be sent to the display terminal only after a complete line is drawn on the local device. In this case, real-time display on the both parties cannot be realized.

The host further transmits actual point coordinates and pressure sensing values, a line is formed by points, and the pressure sensing values can be used to control the width of the line segment. After receiving the information, the display terminal deserializes the information according to the agreed rules to obtain the handwriting information. During drawing, a host of a drawing party performs serialization processing by using a CPU. The local device agrees with the display terminal on serialization rules, and the local device sends serialized data to the display terminal. After receiving the data, the display terminal performs deserialization to obtain real data. The display terminal remembers the attribute and IDs of the drawn line segment that are sent to the display terminal. Then, the coordinates and the pressure sensing values are transmitted. The display terminal adds these independent coordinates and the pressure sensing values to the recorded line segment, draws an image by using local computing power, and draws an image from to-be-drawn handwriting information through computing with a GPU.

Embodiment 2

Figure 3:
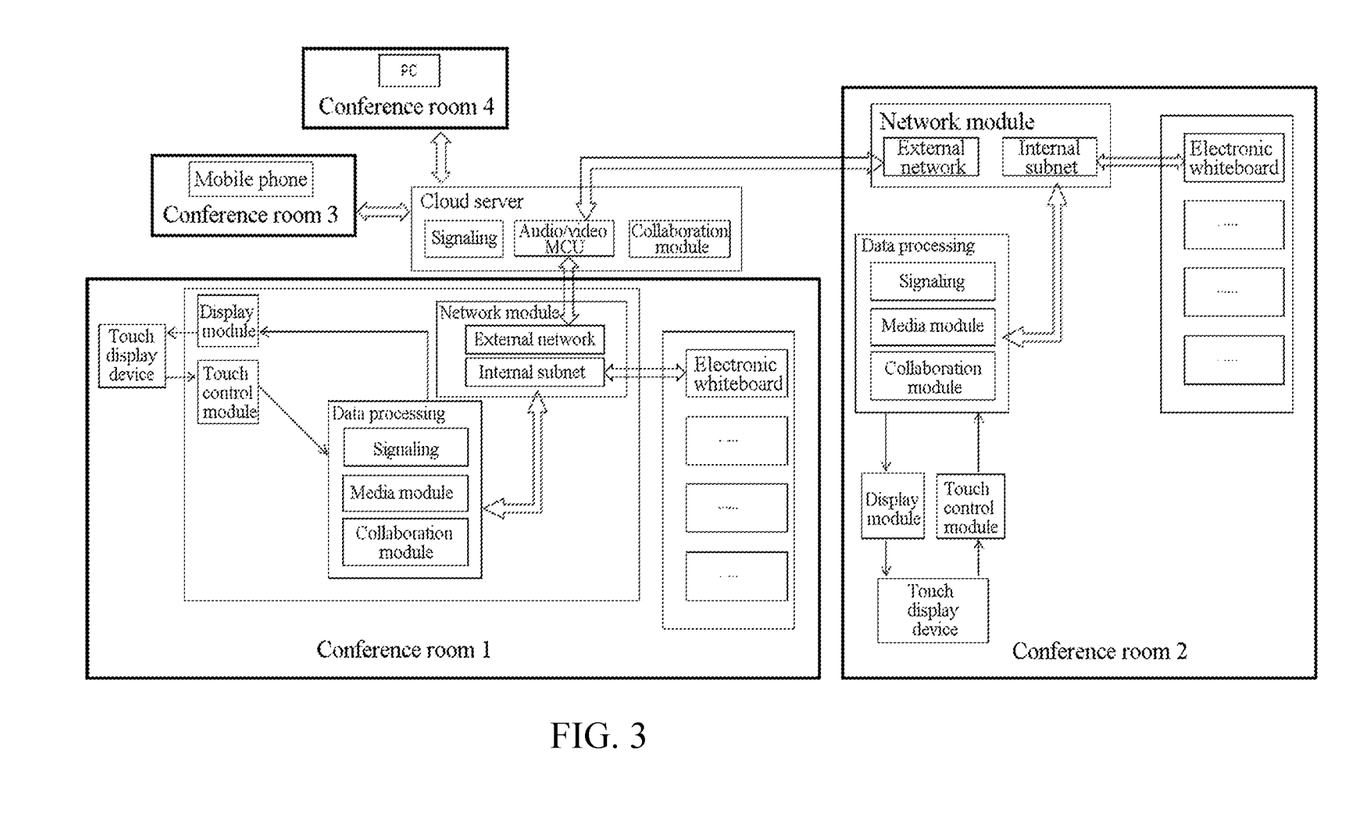
FIG. 3 is an electronic whiteboard collaboration application in a teleconference of the present disclosure.

This embodiment involves interaction in a teleconference. FIG. 3 shows an electronic whiteboard collaboration application system in a teleconference. A teleconference system includes several conference rooms, and a network module of each conference room is connected to a cloud server. The cloud server includes signaling, an audio/video MCU, and a collaboration module. Different conference rooms are registered on a designated cloud server. The conference rooms are connected to each other by using a network, and transmit data to interact with each other. The teleconference shown in FIG. 3 includes four conference rooms. Compositions of conference room 1 and conference room 2 are the same as those of the conference room in the local conference described in Embodiment 1. Conference room 3 is a mobile phone, and conference room 4 is a personal PC. In a conference process, the four conference rooms share data by using the cloud server. The cloud server is connected to a network module in each conference room to transmit data. When a participant makes an annotation mark on conference content, annotation information is serialized on a host of the conference room, and is transmitted in real time to an electronic whiteboard device of the current conference room and the cloud server by using an internal subnet and an external network in a network module of the host of the current conference room. The cloud server sends corresponding signaling to network modules in other participants in the teleconference, which then send the corresponding signaling to electronic whiteboard devices or touch display devices of the other participants for display.

Collaborative interaction logic of each conference room is the same as that of the local conference. An annotation party annotates display content and sends data to a host. The host obtains an attribute and IDs of a drawn line segment, including a line segment ID, a user ID, and a timestamp attribute. The attribute and the IDs of the drawn line segment are sent to a display terminal by using a network module of the host. The display terminal receives and remembers the drawn line segment information. The annotation party then sends coordinates and pressure sensing values. The display terminal adds the coordinates and the pressure sensing values to a recorded line segment after receiving the coordinates and the pressure sensing values, and draws an image through computing with a GPU. The presentation content and the related annotation are divided into two layers and displayed on all participant terminals. The participant terminal supports touch control, that is, allows annotation writing at the same time, and annotation content written on the participant terminal is visible to all terminals.

In addition, the teleconference system can implement multi-party simultaneous operations. The conference rooms transmit data in real time without priority. Any participant can send a message, and the message sent by the participant is transmitted in real time. In the teleconference system, the conference rooms may be located at different locations. In addition to a physical video conference room, a personal mobile device, such as a mobile phone, a personal PC, or a tablet computer, may also be used to attend a conference. The mobile phone and the tablet computer input an annotation mark through touch, and the PC inputs an annotation mark by using a mouse device.

Although the present disclosure and implementations thereof have been exemplarily described above, the description is not limiting. The present disclosure can be implemented in other specific forms without departing from the spirit or the basic feature of the present disclosure. The content shown in the accompanying drawings is merely one of the implementations of the present disclosure, and the actual structure is not limited thereto. Any reference signs in the claims should not be construed as limiting the claims. Therefore, under the teaching of the present disclosure, any structures and embodiments similar to the technical solution that are made by those skilled in the art without creative efforts and without departing from the spirit of the present disclosure shall all fall within the protection scope of the present disclosure. In addition, the term "comprise", "include" or any variant thereof does not exclude other elements or steps, and the term "a" or "an" before an element does not exclude the inclusion of "a plurality of" said elements. A plurality of elements described in the product claims may also be implemented by an element by software or hardware. The terms such as "first" and "second" are used for indicating the names and do not indicate any particular order.

What is claimed is:

1. An information interaction method, comprising:
serializing annotation information on a local device, by a host, wherein the annotation information is drawn by line segment,
drawing an image for display, by a display terminal through computing with a graphics processing unit (GPU), based on the serialized annotation information of the drawn line segment and annotation related information, and
comprising the specific interaction steps:
step 1: displaying an image on the local device and on the display terminal, by the host, through an internal display module;
step 2: annotating the image on the local device, by a user, wherein during annotation, annotation information of the drawn line segment is sent to the host for serialization, and then the serialized drawn line segment information is sent to the display terminal;
step 3: sending annotation related information to the display terminal, by the host, based on the local device; and
step 4: deserializing the received serialized drawn line segment information, by the display terminal, adding the annotation related information to a recorded line segment, and drawing an image for display through computing with the GPU,
wherein the annotation information of the drawn line segment comprises a line segment ID, a user ID, and a timestamp attribute.

2. The information interaction method according to claim 1, wherein the annotation related information comprises coordinates and pressure sensing values.

3. The information interaction method according to claim 1, wherein the annotation information of the drawn line segment and the annotation related information are transmitted separately.

4. The information interaction method according to claim 1, wherein the local device and the display terminal serialize and deserialize the drawn line segment information by using serialization rules.

5. The information interaction method according to claim 4, wherein the host sends processed data to another display terminal by using a network module while processing the annotation information.

6. An information interaction system using the information interaction method according to claim 1, wherein the system comprises a host, a touch display device, and an electronic whiteboard device.

7. The information interaction system according to claim 6, wherein the host comprises a data processing module, a touch control module, a display module, and a network module.

8. A conference system, comprising the information interaction system according to claim 6.

9. The information interaction method according to claim 2, wherein the annotation information of the drawn line segment and the annotation related information are transmitted separately.

\* \* \* \* \*